(12) United States Patent
Onodera

(10) Patent No.: US 12,474,239 B2
(45) Date of Patent: Nov. 18, 2025

(54) METHOD FOR RENDERING TISSUE TRANSPARENT, REAGENT FOR RENDERING TISSUE TRANSPARENT, AND TISSUE OBSERVATION METHOD

(71) Applicant: JAPAN SCIENCE AND TECHNOLOGY AGENCY, Saitama (JP)

(72) Inventor: Hiroshi Onodera, Miyagi (JP)

(73) Assignee: JAPAN SCIENCE AND TECHNOLOGY AGENCY, Saitama (JP)

(*) Notice: Subject to any disclaimer, the term of this patent is extended or adjusted under 35 U.S.C. 154(b) by 1394 days.

(21) Appl. No.: 14/764,060

(22) PCT Filed: Nov. 20, 2013

(86) PCT No.: PCT/JP2013/006811
§ 371 (c)(1),
(2) Date: Jul. 28, 2015

(87) PCT Pub. No.: WO2014/115206
PCT Pub. Date: Jul. 31, 2014

(65) Prior Publication Data
US 2016/0011086 A1    Jan. 14, 2016

(30) Foreign Application Priority Data

Jan. 28, 2013 (JP) ............................. 2013-012889
Jul. 17, 2013 (WO) .................. PCT/JP2013/004369

(51) Int. Cl.
*G01N 1/30* (2006.01)
*G01N 33/50* (2006.01)

(52) U.S. Cl.
CPC ........... *G01N 1/30* (2013.01); *G01N 33/5082* (2013.01)

(58) Field of Classification Search
CPC .......................... G01N 1/30; G01N 33/5082
See application file for complete search history.

(56) References Cited

U.S. PATENT DOCUMENTS

| 6,472,216 B1 | 10/2002 | Chiang |
| 2002/0146715 A1 | 10/2002 | Okamoto et al. |

(Continued)

FOREIGN PATENT DOCUMENTS

| CN | 102859344 A | 1/2013 |
| CN | 103562702 A | 2/2014 |

(Continued)

OTHER PUBLICATIONS

Genina et al, Tissue optical immersion clearing 2010, Expert Rev. Med. Devices, 7(6): 825-842 (Year: 2010).*

(Continued)

*Primary Examiner* — Sharmila G Landau
*Assistant Examiner* — Stephanie A McNeil
(74) *Attorney, Agent, or Firm* — EVENTIDE LAW LLC

(57) ABSTRACT

A method for rendering tissue transparent, comprising a procedure of immersing the tissue in a water-soluble solvent comprising 2,2'-thiodiethanol and at least one of glycerol and a nonionic organoiodine compound is provided as a technique capable of sufficiently rendering various organs transparent without causing their changes by a simple operation without using any poisonous or dangerous organic solvent. In the method for rendering tissue transparent, a mixed solvent of 2,2'-thiodiethanol, glycerol, and a nonionic organoiodine compound aqueous solution is preferably used as the water-soluble solvent.

14 Claims, 22 Drawing Sheets

(56) References Cited

U.S. PATENT DOCUMENTS

| | | | | |
|---|---|---|---|---|
| 2012/0114563 A1* | 5/2012 | Carter | ............... | A61K 49/0032 424/9.6 |
| 2013/0045503 A1 | 2/2013 | Miyawaki et al. | | |
| 2014/0087419 A1 | 3/2014 | Miyawaki et al. | | |
| 2014/0178927 A1 | 6/2014 | Miyawaki et al. | | |

FOREIGN PATENT DOCUMENTS

| | | | |
|---|---|---|---|
| GB | 2377757 A | 1/2003 | |
| GB | 2377757 B | 11/2004 | |
| JP | 11187900 A | 7/1999 | |
| JP | 2001220529 A | 8/2001 | |
| JP | 2007051957 A | 3/2007 | |
| JP | 2013522590 A | 6/2013 | |
| WO | 0024454 A1 | 5/2000 | |
| WO | 2011111876 A1 | 9/2011 | |
| WO | 2012147965 A1 | 11/2012 | |
| WO | 2012161143 A1 | 11/2012 | |

OTHER PUBLICATIONS

Hirano et al., Influence of angiography contrast media on viability of endotherial cells in cultures, 2004, Colloids and Surfaces B: Biointerfaces, 33: 205-210 (Year: 2004).*
Bracco UK Limited, 2018, IOMERON 400, Summary of Product Characteristics, https://www.medicines.org.uk/emc/product/3894/smpc (Year: 2018).*
Kiernan, Formaldehyde, formalin, paraformaldehyde and glutaraldehyde: What they are and what they do., 2000, Microscopy Today 00-1 pp. 8-12 (Year: 2000).*
Parra et al, Multiphoton microscopy of cleared mouse organs, 2010, Journal of Biomedical Optics, 15(3) 036017 (Year: 2010).*
Saito et al, Ex vivo imaging of mouse brain using micro-CT with non-ionic iodinated contrast agent: a comparison with myelin staining, 2012, The British Journal of Radiology, 85: e973-e978 (Year: 2012).*
Selleck Chemicals, Iopamidol Catalog No. S4532; https://www.selleckchem.com/datasheet/iopamidol-S453201-DataSheet.html (Year: 2022).*
Dooley, Iomeprol: a review of its use as a contrast medium, 2000, Drugs, 59(5):1169-86 (Year: 2000).*
Extended European Search Report dated Sep. 29, 2016 for EP 13872734.2.
Smith, et al., Subgross breast pathology in the twenty-first century; Virchows Arch, 2012, vol. 460, pp. 489-495.
Gonzalez-Bellido et al., Labeling and Confocal Imaging of Neurons in Thick Invertebrate Tissue Samples; Cold Spring Harbor Protocols, Sep. 2012; vol. 2012, Issue 9, pp. 969-983.
Appleton, et al., Preparation of wholemount mouse intestine for high-resolution three-dimensional imaging using two-photon microscopy; Journal of Microscopy, 2009, vol. 234, Pt. 2, pp. 196-204.
Tsai, et al., Correlations of Neuronal and Microvascular Densities in Murine Cortex Revealed by Direct Counting and Colocalization of Nuclei and Vessels; Journal of Neuroscience, Nov. 18, 2009, vol. 29, No. 46, pp. 14553-14570.
Martin, et al., Hydroxylated secondary dopants for surface resistance enhancement in transparent poly(3,4-ethylenedioxythiophene)-poly(styrenesulfonate) thin films; Synthetic Metals, 2004, vol. 142, pp. 187-193.
Erturk, et al., Three-dimensional imaging of the unsectioned adult spinal cord to assess axon regeneration and glial responses after injury, Nature Medicine, Jan. 2012, vol. 18, No. 1, pp. 166-171 and "Online Method" p. 1.
Hama, et al., Scale: a chemical approach for fluorescence imaging and reconstruction of transparent mouse brain; Nature Neuroscience; Nov. 2011, vol. 14, No. 11, pp. 1481-1488 and "Online Methods" pp. 1-2.
Tomita, et al., Visual Properties of Transgenic Rats Harboring the Channelrhodopsin-2 Gene Regulated by the Thy-1.2 Promoter; PLoS one; Nov. 2009, vol. 4, No. 11, e7679, pp. 1-13.
Staudt, et al., 2,2'-Thiodiethanol: A New Water Soluble Mounting Medium for High Resolution Optical Microscopy; Microscopy Research and Technique, 2007, vol. 70, pp. 1-9.
International Search Report issued in International Application No. PCT/JP2013/006811; Mailing Date Feb. 18, 2014.
International Search Report issued in International Application No. PCT/JP2013/004369; Mailing Date Sep. 17, 2013.
Chinese Office Action dated Nov. 4, 2016 for CN201380071465.
PubChem, "Diatrizoate Sodium", National Center for Biotechnology Information, https://pubchem.ncbi.nlm.nih.gov/compound/Diatrizoate_sodium, Accessed on Oct. 7, 2018, 34 pages.
PubChem, "Ioxaglate Sodium", National Center for Biotechnology Information, https://pubchem.ncbi.nlm.nih.gov/compound/ioxaglate_sodium, Accessed on Oct. 7, 2018, 20 pages.
PubChem, "Iothalamate Sodium", National Center for Biotechnology Information, https://pubchem.ncbi.nlm.nih.gov/compound/Iothalamate_sodium, Accessed on Oct. 7, 2018, 23 pages.
Australian Product Information, "Biliscopin(R) for Infusion (Meglumine iotroxate)", date of revision Jun. 14, 2018, pp. 1-12.
National Institutes of Health, "Iopanoate Sodium", https://drugs.ncats.io/drug/439WET4G58, Accessed on Oct. 7, 2018, 4 pages.
PubChem, "Sodium Iopodate", National Center for Biotechnology Information, https://pubchem.ncbi.nlm.nih.gov/compound/16051997, Accessed on Oct. 7, 2018, 16 pages.
PubChem, "Metrizoate Sodium", National Center for Biotechnology Information, https://pubchem.ncbi.nlm.nih.gov/compound/Sodium_metrizoate, Accessed on Oct. 7, 2018, 22 pages.
PubChem, "Iodamide", National Center for Biotechnology Information, https://pubchem.ncbi.nlm.nih.gov/compound/Iodamide, Accessed on Oct. 7, 2018, 22 pages.
PubChem, "Iodoxamate Sodium", National Center for Biotechnology Information, https://pubchem.ncbi.nlm.nih.gov/compound/Iodoxamate_sodium, Accessed on Oct. 7, 2018, 13 pages.
Guerbet, "Lipiodol Ultra-Fluide (480 mg I/ml), Solution for Injection", 2005, 5 pages.
KEGG Drug, "Ioxilan, Iotrolan, Iopamidol, Iopromide, Iohexol, and Iomeprol", https:f/www.kegg.jp/dbget-bin/www _bget?dr_ ja:002161 etc., Accessed on Aug. 24, 2018, 12 pages (odd pages Japanese, even pages English translations).
Google Translate, "Nonionic Contrast Medium", Accessed on Oct. 7, 2018, 1 page.
Bayer, "Urografin", MIMS/myDr, Sep. 2013, 3 pages.
Regional Health Limited, "Iomeron", New Zealand Data Sheet, Jul. 28, 2006, 9 pages.
Kuwatsuru et al., "Development of Iodinated X-ray Contrast Media: Past, Present, and Future," Nichidoku-Iho, 2005, vol. 50, No. 1, pp. 105-113 (English abstract and Table 1).
Yamakawa et al., "Effect of Contrast Materials on Rheological Properties of Blood," Heart, 1981, vol. 13, No. 7, pp. 768-774 (English translation of text).
De Grand et al., "Selecting a Microscope Based on Imaging Depth", BioPhotonics Media, pp. 1-9, Jan. 2015, available at https://www.photonics.com/Articles/Selecting_a_Microscope_Based_on_Imaging_Depth/a57114, last accessed Mar. 5, 2020.
Dickie et al., "Three-dimensional visualization of microvessel architecture of whole-mount tissue by confocal microscopy", Microvascular Research, vol. 72, pp. 20-26, Jun. 23, 2006.
Written Opinion for International Application No. PCT/JP2013/004369 dated Sep. 17, 2013 (English machine translation included).
Written Opinion for International Application No. PCT/JP2013/006811 dated Feb. 18, 2014 (English translation included).
Notice of Reasons for Refusal for Japanese Application No. 2014-558293; date of drafting: Sep. 11, 2017 (English machine translation included).
Second Office Action for Chinese Application No. 201380071465.X, issued on Jul. 11, 2017 (English machine translation included).
Third Office Action for Chinese Application No. 201380071465.X, issued on Jan. 9, 2018 (English machine translation included).

(56) References Cited

OTHER PUBLICATIONS

International Search Report and Written Opinion for International Application No. PCT/JP2013/004369 dated Sep. 17, 2013 (English machine translation included).
International Search Report and Written Opinion for International Application No. PCT/JP2013/006811 dated Feb. 18, 2014 (English translation included).
Third Office Action for Chinese Application No. 201380071465.X dated Jan. 9, 2018 (English machine translation included).
Elsevier, "Mosby's Dictionary of Medicine, Nursing & Health Professions," 9th Edition, title page, copyright page, pp. 314, 1382, and 1780 (2013).
E-Micro Corporation, "Detailed Specification/Condition," pp. 1-9, available at http://e-micro.jp/Detail/TNO/T025x/T0253/T0253HT.htm, last accessed Oct. 22, 2020 (including English translation).
Membrane Solutions, "Culture Dish, petri dish, cell culture dish—Membrane Solutions," p. 1, available at https://www.membrane-solutions.com/tissue_culture_dishes.htm, last accessed Nov. 10, 2020.
Olympus Corporation, "Types and Uses of Microscopes," pp. 1-11, available at https://www.olympus-lifescience.com/en/support/learn/02/029/, last accessed Nov. 9, 2020 (including partial English translation).
SigmaAldrich, Cell Culture Protocol 6: Cell Counting Using a Hemocytometer, pp. 1-3, available at https://www.sigmaaldrich.com/technical-documents/protocols/biology/cell-quantification.html?gclid=EAlalQobChMlz_q_mffm7AIVCK_ICh0snQh-EAAYASAAEgKOS_D_BwE, last accessed Nov. 3, 2020 (2020).

* cited by examiner

A B

A

B

A

B

A

B

METHOD FOR RENDERING TISSUE TRANSPARENT, REAGENT FOR RENDERING TISSUE TRANSPARENT, AND TISSUE OBSERVATION METHOD

TECHNICAL FIELD

The present invention relates to a method for rendering tissue transparent, a reagent for rendering tissue transparent, and a tissue observation method. More specifically, the present invention relates to a method for rendering tissue transparent, capable of simply and safely rendering tissue transparent without causing its change, and the like.

BACKGROUND ART

With the recent progress of genetic transformation and gene introduction technologies, it has been carried out to label only specific cells in any of various organs with a fluorescent protein for observation. For example, attempts have been made to selectively label various neural circuits in the brain with fluorescence to 3-dimensionally visualize the neural circuits using the fluorescence as an indicator for reconstruction.

Conventionally, the observation of the internal tissue of an organ has been performed by mechanically slicing the fixed and embedded organ (or organ piece) to prepare tissue sections and observing each section under a light microscope. In recent years, the observed image of the internal tissue of an organ has come to be obtained by optically "cutting" the organ using a confocal laser microscope or a multiphoton excitation fluorescence microscope.

When a tissue structure, such as a neural circuit, is 3-dimensionally observed, the above mechanical method requires the preparation of many continuous tissue sections and the piling-up of their fluorescence images, which is accompanied by great labor. In contrast, the optical method has the problem of making the acquisition of fluorescence images more difficult (observation depth limit) as an increase in the depth of an observed site from the organ surface because light scatters inside the organ.

The observation depth limit is generally considered to be on the order of 0.15 mm for the confocal laser microscope and on the order of up to 4 mm for the two-photon excitation fluorescence microscope. For example, for the brain of mice widely used for research, since the cortex as the outer layer has a thickness of about 1 mm, it is necessary to expand the observation depth limit to several millimeters in order to observe the hippocampus or thalamus located on the more internal side of the brain than that for the cortex.

Accordingly, a technique for rendering an organ transparent has been studied as a technique for expanding the observation depth limit by suppressing the scattering of light inside the organ. For example, Non Patent Literature 1 reports that the brain/spinal cord was rendered transparent by a method using tetrahydrofuran. In addition, Patent Literature 1 and Non Patent Literature 2 state that the brain was successfully rendered transparent by a method using urea at a high concentration (Scale method).

Non Patent Literature 4 states that tissues, such as the thoracic ganglion of a dragonfly and the skin of a squid, were each successfully rendered transparent to a thickness of on the order of 0.6 mm using 2,2'-thiodiethanol. Non Patent Literature 5 preceding this literature states that 2,2'-thiodiethanol is used as a mounting medium.

CITATION LIST

Patent Literature

Patent Literature 1: National Publication of International Patent Application No. 2013-522590

Non Patent Literature

Non Patent Literature 1: "Three-dimensional imaging of the unsectioned adult spinal cord to assess axon regeneration and glial responses after injury." Nature Medicine, 2011, Vol. 18, No. 1, pp. 166-71

Non Patent Literature 2: "Scale: a chemical approach for fluorescence imaging and reconstruction of transparent mouse brain." Nature Neuroscience, 2011, Vol. 14, No. 11, pp. 1481-1488

Non Patent Literature 3: "Visual properties of transgenic rats harboring the channelrhodopsin-2 gene regulated by the thy-1.2 promoter." PLoS ONE, 2009, Vol. 4, No. 11, e7679

Non Patent Literature 4: "Labeling and confocal imaging of neurons in thick invertebrate tissue samples." Cold Spring Harbor Protocol, 2013

Non Patent Literature 5: "2,2'-thiodiethanol: a new water soluble mounting medium for high resolution optical microscopy." Microscopy Research and Technique, 2007, 70:1-9

SUMMARY OF INVENTION

Technical Problem

The transparentization method described in Non Patent Literature 1 is excellent in the transparentization degree but requires the use of an organic solvent containing dichloromethane suspected of having carcinogenicity and has problems of flammability of the organic solvent and difficulty in waste liquid management. The method also has a problem that the hardening of an organ and the disappearance or attenuation of the fluorescence signal of a labeled fluorescent protein in the organ occur under the influence of the process of dehydrating the fixed organ and the transparentization reagent itself.

The transparentization method disclosed in Non Patent Literature 2 (Scale method) can solve the above problems with the method described in Non Patent Literature 1 because the Scale method can use a water-soluble reagent for which the dehydration of a biomaterial is not required. However, the Scale method requires a long period of time (on the order of 2 weeks) for transparentization treatment and has an insufficient degree of transparentization. In addition, this method has a problem that the organ is excessively swelled and weakened.

The conventional method using 2,2'-thiodiethanol has a transparentizable tissue thickness of as low as on the order of 0.6 mm and thus has an insufficient observation depth (see Non Patent Literature 4). In addition, the use of 2,2'-thiodiethanol at concentrations of as high as 80 to 85% or more resulted in the disappearance or attenuation of a fluorescence signal in some fluorescent proteins, such as GFP (see Non Patent Literature 5).

In view of the problems with these conventional techniques, the main object of the present invention is to provide a technique capable of sufficiently rendering various organs transparent without causing their changes by a simple operation without using any poisonous or dangerous organic solvent.

Solution to Problem

The present invention provides a method for rendering tissue transparent, comprising a procedure of immersing the tissue in a water-soluble solvent having a refractive index of 1.4 to 1.7.

In the method for rendering tissue transparent, a mixed solution of 2,2'-thiodiethanol, glycerol, and a nonionic organoiodine compound aqueous solution is suitably used as the above water-soluble solvent. In this case, the proportions by volume of 2,2'-thiodiethanol, glycerol, and a nonionic organoiodine compound aqueous solution having an iodine content of 40% in the aqueous solvent are 10 to 50%, 1 to 20%, and 10 to 70%, respectively.

The aqueous solvent to be used may also be a mixed solution of 2,2'-thiodiethanol and a nonionic organoiodine compound aqueous solution. In this case, the proportions by volume of 2,2'-thiodiethanol and a nonionic organoiodine compound aqueous solution having an iodine content of 40% in the aqueous solvent are 20 to 80% and 80 to 20%, respectively.

In addition, the aqueous solvent to be used may also be a mixed solution of 2,2'-thiodiethanol and glycerol. In this case, the proportions by volume of 2,2'-thiodiethanol and glycerol in the aqueous solvent are 70 to 95% and 5 to 30%, respectively.

To reduce the concentration of 2,2'-thiodiethanol in the aqueous solvent and prevent the disappearance or attenuation of the fluorescence signal of a fluorescent protein, the aqueous solvent to be used is preferably a mixed solution of 2,2'-thiodiethanol and a nonionic organoiodine compound aqueous solution, or one further comprising glycerol.

In addition, the water-soluble solvent may further comprise a sucrose aqueous solution, depending on the organ of interest.

The present invention also provides a reagent for rendering tissue transparent, comprising a water-soluble solvent having a refractive index of 1.4 to 1.7. The reagent for rendering tissue transparent comprises a water-soluble solvent comprising 2,2'-thiodiethanol and at least one of glycerol and a nonionic organoiodine compound. Depending on the organ of interest, the reagent for rendering tissue transparent is a mixed solution of 2,2'-thiodiethanol and a nonionic organoiodine compound aqueous solution, or a mixed solution of 2,2'-thiodiethanol and glycerol, preferably a mixed solution of 2,2'-thiodiethanol, glycerol, and a nonionic organoiodine compound aqueous solution.

The reagent for rendering tissue transparent may further comprise a sucrose aqueous solution, depending on the organ of interest.

In addition, the present invention provides a tissue observation method comprising a transparentization procedure which involves immersing tissue in a water-soluble solvent having a refractive index of 1.4 to 1.7.

The tissue observation method may specifically comprise a labeling procedure involving fluorescently labeling the tissue, the transparentization procedure involving immersing the fluorescently labeled tissue in the solvent, and a detection procedure involving detecting fluorescence emitted from the fluorescent label in the transparentized tissue.

The tissue observation method may also comprise the transparentization procedure involving immersing the tissue in the solvent, a labeling procedure involving fluorescently labeling the transparentized tissue, and a detection procedure involving detecting fluorescence emitted from the fluorescent label in the transparentized and fluorescently labeled tissue.

According to the tissue observation method, observation using a fluorescence microscope, a fluorescence stereomicroscope, a confocal microscope, or a multiphoton microscope can be suitably adopted in the detection procedure.

For the purpose of the present invention, the term "tissue" shall be used synonymously with "organ" and refers, in its broad sense, to body tissue. The "tissue (or organ)" includes, but is not particularly limited to, the brain, spinal cord, liver, spleen, kidney, lung, heart, blood vessel, skin, subcutaneous tissue, bowel, fat tissue, lymph node, muscle, tendon, and cancer tissue. Bone can also be amenable to the method for rendering tissue transparent and the like according to the present invention provided that it is bone in which calcification has not progressed, like the bone of a fetus or a newborn.

Advantageous Effect of Invention

According to the present invention, a technique is provided, which can sufficiently rendering various organs transparent without causing their changes by a simple operation without using any poisonous or dangerous organic solvent.

DESCRIPTION OF EMBODIMENTS

Figure 1:
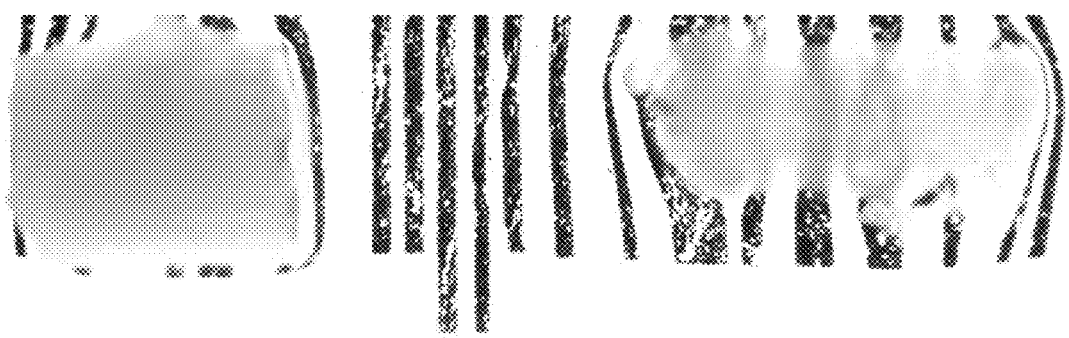
FIG. 1 is a pair of drawing substitute photographs each showing a transparentized rat spinal cord. (A) represents the spinal cord rendered transparent by a conventional method and (B), by the method according to the present invention.

Preferred embodiments for carrying out the method for rendering tissue transparent and the tissue observation method comprising the method for rendering tissue transparent as a procedure according to the present invention will be described below. The embodiments to be described below are intended only to show an example of an exemplary embodiment of the present invention, but the scope of the present invention is not intended to be construed in a limiting sense thereby.

(1) Procedure for Rendering Tissue Transparent (Method for Rendering Tissue Transparent)

The method for rendering tissue transparent and the tissue observation method according to the present invention comprise a transparentization procedure which involves immersing the tissue in a water-soluble solvent having a refractive index of 1.4 to 1.7 (an reagent for rendering tissue transparent). The refractive index of the water-soluble solvent is preferably 1.50 to 1.52.

[Organ of Interest]

In the method for rendering tissue transparent and the tissue observation method according to the present invention, the organ (or organ piece) of interest is not particularly limited; however, examples thereof include the brain, spinal cord, liver, spleen, kidney, lung, heart, blood vessel, skin, subcutaneous tissue, bowel, fat tissue, lymph node, muscle, tendon, and cancer tissue, and bone. The present invention has first demonstrated that 2,2'-thiodiethanol (hereinafter simply referred to as "thiodiethanol") can be used in combination with glycerol to render transparent even a tissue having a thickness of 1 mm or more, specifically a thickness of on the order of 1 mm to 2 cm.

[Reagent for Rendering Tissue Transparent]

The refractive index of the water-soluble solvent (hereinafter also referred to as "reagent for rendering tissue transparent") can be properly set in the range of the above values, depending on the organ of interest. Preferred examples of the reagent for rendering tissue transparent satisfying the above refractive index include a mixed solution of thiodiethanol (refractive index: 1.52) and a nonionic organoiodine compound aqueous solution (the refractive index of the aqueous solution having an iodine content of 40%: about 1.51), or a mixed solution of thiodiethanol and glycerol (refractive index: 1.474); more preferred examples thereof include a mixed solution of thiodiethanol, glycerol, and a nonionic organoiodine compound aqueous solution. The reagent for rendering tissue transparent may further comprise a sucrose aqueous solution, if necessary, depending on the organ of interest.

For the mixed solution of thiodiethanol, glycerol, and a nonionic organoiodine compound aqueous solution, the proportions by volume of thiodiethanol, glycerol, and a nonionic organoiodine compound aqueous solution having an iodine content of 40% in the aqueous solvent are 10 to 50%, 1 to 20%, and 10 to 70%, respectively.

When the mixed solution of thiodiethanol and a nonionic organoiodine compound aqueous solution is used, the proportions by volume of thiodiethanol and a nonionic organoiodine compound aqueous solution having an iodine content of 40% in the aqueous solvent are 20 to 80% and 80 to 20%, respectively.

In addition, when the mixed solution of thiodiethanol and glycerol is used, the proportions by volume of thiodiethanol and glycerol in the aqueous solvent are 70 to 95% and 5 to 30%, respectively.

When the sucrose aqueous solution is added, the addition volume of one or more of thiodiethanol, glycerol, and a nonionic organoiodine compound aqueous solution may be decreased, depending on the addition volume of the sucrose aqueous solution.

The proportions by volume of thiodiethanol, glycerol, a nonionic organoiodine compound aqueous solution, and a sucrose aqueous solution in the reagent for rendering tissue transparent can be adjusted in a wide range, depending on a desired degree of transparentization of the organ of interest.

The volume of thiodiethanol can be increased in the reagent for rendering tissue transparent to increase the degree of transparentization of the organ. For example, when the organ of interest is a lung, the use of the mixed solvent of thiodiethanol:glycerol=70:30 can leave the thick bronchi while maintaining their visibility in such a manner that they are not completely rendered transparent. In contrast, the use of the mixed solvent of thiodiethanol:glycerol=85:15 can increase the degree of transparentization of the bronchi to sufficiently render the whole lung transparent.

As described above, the reagent for rendering tissue transparent to be used may be a mixed solution of thiodiethanol and a nonionic organoiodine compound aqueous solution; however, to obtain a high degree of transparentization and the high fluorescence signal retentiveness of a fluorescent protein, the reagent to be used is most preferably a reagent in which glycerol is added to thiodiethanol and a nonionic organoiodine compound aqueous solution. When the reagent for rendering tissue transparent to be used is a mixed solution of thiodiethanol and glycerol, the addition of glycerol can render an organ transparent while suppressing the disappearance or attenuation of the fluorescence signal of a fluorescent protein even under conditions of a relatively high concentration (a proportion by volume higher than 80%) of thiodiethanol.

The amount of thiodiethanol to be used can be decreased to on the order of 10 to 50%, preferably on the order of 20 to 50% by adding a nonionic organoiodine compound aqueous solution having a refractive index falling within the above refractive index range (1.4 to 1.7) (the refractive index of the aqueous solution having an iodine content of 40%: about 1.51) to the reagent for rendering tissue transparent. This can maintain the fluorescence signal of a fluorescent protein at a good level even after transparentization.

When a nonionic organoiodine compound is added to the reagent for rendering tissue transparent, for example, the proportion by volume of the aqueous solution having an iodine content of 40% is preferably 10 to 80% by volume. The iodine content (mass/volume %) can be calculated from the ratio of the mass of an iodine atom to the total mass of a nonionic organoiodine compound and the concentration (mass/volume %) of the nonionic organoiodine compound in the aqueous solution. The iodine content of a nonionic organoiodine compound aqueous solution can be changed as needed and is not limited to 40%. The proportion by volume of the nonionic organoiodine compound aqueous solution in the reagent for rendering tissue transparent can also be properly adjusted depending on the iodine content.

The nonionic organoiodine compound to be used may be, for example, a nonionic iodinated contrast medium in which hydrophilicity is imparted to an organic compound containing a high concentration of iodine atoms. Examples of the nonionic iodinated contrast medium include heretofore known contrast media, such as ioxilan, iotrolan, iopamidol, iopromide, iohexol, and iomeprol.

When sucrose is added to the reagent for rendering tissue transparent, the proportion by volume of a 30% sucrose aqueous solution is preferably 2 to 10% by volume. The addition of the sucrose aqueous solution can increase the degree of transparentization of an organ by enhancing the penetrance of the reagent for rendering tissue transparent. Without being bound by theory, the cause is presumed to be the prevention of the opacity of the cell membrane and the cytoplasm due to the excessive fixation of tissue enabled by the addition of sucrose.

A preferable example of the composition of the reagents for rendering tissue transparent include, for example, a mixed solution having a volume ratio of thiodiethanol to glycerol to a nonionic organoiodine compound aqueous solution having an iodine content of 40% of 45:5:50.

Dimethyl sulfoxide (DMSO) may be added to the reagent for rendering tissue transparent. DMSO contributes to increasing the degree of transparentization of an organ by enhancing the penetrance of the reagent for rendering tissue transparent. The addition concentration of DMSO is, for example, 0.1 to 10%. When DMSO is added, the addition volume of one or more of thiodiethanol, glycerol, a nonionic organoiodine compound aqueous solution, and a sucrose aqueous solution may be decreased, depending on the addition volume of DMSO.

As water-soluble solvents satisfying a refractive index of 1.4 to 1.7, polyhydric alcohols, polyhydric alcohol derivatives, nitrogen-containing solvents, alcohols, sulfur-containing solvents, and their mixed solvents, and the like in addition to the above mixed solvents can be used in some cases. A monosaccharide other than sucrose and/or a polysaccharide can also be added to the water-soluble solvent in some cases; however, sucrose is probably preferable in view of its high solubility in water.

[Immersion]

The organ is rendered transparent by immersion in the reagent for rendering tissue transparent for a predetermined time. The immersion is preferably performed at on the order of 4 to 60° C., particularly preferably at on the order of 20 to 42° C. The reagent is warmed to room temperature or more to reduce the viscosity of the reagent, resulting in enhanced penetrance into the organ. To prevent the precipitation of sucrose at a lower temperature, it is preferable to use an aqueous solution having a sucrose concentration of on the order of 30% as the sucrose aqueous solution. The immersion time varies depending on the organ of interest; however, it is, for example, 24 hours to 6 days. By way of example, when the organ of interest is the brain, spinal cord, heart, skin, or muscle, the immersion is performed for on the order of 4 to 6 days. When the organ of interest is liver, kidney, lung, blood vessel, lymph node, or cancer tissue, the immersion is preferably performed for 24 hours to 3 days.

When the organ is immersed in the reagent for rendering tissue transparent, it may be immersed in a pretreatment solution having a reduced volume ratio of thiodiethanol as a preprocedure for immersion in a final solution in which thiodiethanol, glycerol and/or a nonionic organoiodine compound aqueous solution, and, if necessary, a sucrose solution are mixed at the above volume ratio.

The pretreatment solution to be used may be a plurality of solutions having different proportions by volume of thiodiethanol, in which case the organ is immersed in the pretreatment solutions for a set time in order of increasing the proportion by volume of thiodiethanol. When stepwise immersion is carried out, a sucrose-containing treatment solution may be used at a preprocedure with a sucrose-free treatment solution finally used, which is effective if the precipitation of sucrose is a problem. The multi-step (2 steps or more) pretreatment is particularly effective when a mixed solution of thiodiethanol, glycerol, and, if necessary, a sucrose aqueous solution as the reagent for rendering tissue transparent is used as a final solution, and not always necessary when a mixed solution comprising a nonionic organoiodine compound aqueous solution is used as a final solution.

As an example of multi-step pretreatment using a reagent for rendering tissue transparent not comprising a nonionic organoiodine compound aqueous solution, when the organ of interest is brain or spinal cord, it is immersed in the solution of thiodiethanol:glycerol:30% sucrose=20:40:40, the solution of 50:40:10, and the solution of 70:25:5 as pretreatment solutions each for 24 hours in that order and then immersed in a final solution (90:5:5) (for 24 hours). Other organs are each immersed, for example, in a solution of thiodiethanol:glycerol=20:80, a solution of 50:50, and a solution of 70:30 as pretreatment solutions in that order each for 24 hours and then immersed in a final solution (85:15) (for 24 hours).

When the reagent for rendering tissue transparent comprising a nonionic organoiodine compound aqueous solution is used, one-step pretreatment can render brain transparent in on the order of 3 to 4 days and all other tissues except bone transparent in on the order of 2 days. In this case, for example, a solution of thiodiethanol:glycerol:30% sucrose=20:40:40 is used as a pretreatment solution, and a solution of thiodiethanol:glycerol:a nonionic organoiodine compound aqueous solution having an iodine content of 40%=45:5:50 is used as a final solution (a reagent for rendering tissue transparent). The immersion is performed in the pretreatment solution, for example, at 4° C. to 25° C. for 24 hours and in the final solution, for example, at 4° C. to 25° C. for 24 to 48 hours.

The method for rendering tissue transparent according to the present invention provides a sufficient degree of transparentization of an organ by a short-time operation compared to the conventional method. The method for rendering tissue transparent according to the present invention can also render an organ transparent by immersion in a water-soluble solvent without using any poisonous or dangerous organic solvent (see Examples to be described later). Thus, the method for rendering tissue transparent according to the present invention has no problems of flammability of the organic solvent and difficulty in waste liquid management and is highly safe.

In addition, the method for rendering tissue transparent according to the present invention uses no organic solvent; thus, fluorescences from almost all fluorescent labels are retained without causing the disappearance or attenuation of the fluorescence signal of a labeled fluorescent protein in the organ to occur under the influence of the process of dehydrating the fixed organ and the reagent for rendering tissue transparent itself. Further, the method for rendering tissue transparent according to the present invention also provides an effect of preventing the deterioration (decoloration) of the fluorescent protein by glycerol added to the water-soluble solvent.

(2) Fixation Procedure

In the method for rendering tissue transparent and the tissue observation method according to the present invention, a fixation procedure by a heretofore known histopathological method may be performed before the above procedure for rendering tissue transparent. The fixation procedure may be combined with a heretofore known delipidation treatment or the like, if necessary.

For the fixation procedure, a method can be adopted, which involves perfusion-fixing an organ with a formalin solution (10% neutral formalin solution, 4% paraformaldehyde buffer solution), then removing the organ, and further immersing the organ in the same solution for on the order of 24 hours or more. Alternatively, a method can also be adopted, which involves immersing an organ removed without perfusion fixation in a formalin solution for on the order of 48 hours or more. After fixation, it is preferable to remove the formalin atmosphere and perform a procedure for rendering tissue transparent.

(3) Labeling Procedure/Detection Procedure

[Fluorescent Label Before Transparentization]

According to the tissue observation method of the present invention, the above transparentization procedure can be performed after fluorescently labeling the tissue to detect fluorescence emitted from the fluorescent label in the transparentized tissue. As described above, the method for rendering tissue transparent according to the present invention enables the retainment of fluorescences from almost all fluorescent labels and can prevent the deterioration (decoloration) of fluorescent proteins and thus is also suitable for tissue observation with multiple staining using a plurality of fluorescent labels.

The labeling procedure can be performed by heretofore known methods, including a method involving causing a fluorescent protein to be expressed in tissue (e.g., nerve fiber) by gene introduction; a method involving injecting a fluorescent protein or a fluorescent dye into an organ (e.g., blood vessel); and a method involving binding cells to an antibody labeled with a fluorescent protein or a fluorescent dye. Here, the fluorescent dye shall refer to a low-molecular compound (e.g., fluorescein) having a lower molecular weight than that of a fluorescent protein, such as GFP. The fluorescent protein and the fluorescent dye to be used may be heretofore known substances.

The procedure for detecting fluorescence emitted from a fluorescent label in the transparentized tissue can also be performed using a heretofore known fluorescence detection means, such as observation using a fluorescence microscope, a fluorescence stereomicroscope, a confocal microscope, or a multiphoton microscope, without particular limitation. The method for rendering tissue transparent according to the present invention enables the high degree of transparency of an organ to be attained and thus enables the expansion of the observation depth limit with a confocal microscope or a multiphoton microscope to several millimeters.

The tissue observation method according to the present invention can render various organs transparent without hardening, swelling, and weakening them using the procedure for rendering tissue transparent (see Examples to be described later). Thus, unlike a conventional method such as the Scale method, this method enables observation while maintaining the state of the removed organ. The organ can be easily sliced with a knife or the like even after transparentization; thus, tissue staining can also be performed after transparentization for observation.

In addition, the tissue observation method according to the present invention does not cause the disappearance or attenuation of the fluorescence signal from a labeled fluorescent protein in an organ as described above, enabling fluorescent observation with high accuracy. Particularly, the tissue observation method according to the present invention produces an effect in observing the deep part of an organ with extremely weak excitation energy using a multiphoton microscope.

[Fluorescent Labeling after Transparentization]

According to the tissue observation method of the present invention, after performing the above transparentization procedure, the transparentized tissue can also be fluorescently labeled to detect fluorescence emitted from the fluorescent label in the transparentized tissue.

The method for rendering tissue transparent according to the present invention can render an organ transparent without excessively swelling or weakening the organ, enabling the transparentized organ to be sliced. Thus, if the organ piece obtained by slicing after transparentization is stained by an immunohistochemical method using a fluorescence-labeled antibody, the transparentized tissue can be fluorescently labeled.

The transparentized organ or organ piece can also be subjected to heretofore known histopathological staining using any of various stain solutions. Particularly, the method for rendering tissue transparent according to the present invention can render an organ transparent while causing the organ to retain fat, also enabling the organ to be subjected to fat staining, such as Sudan III staining, oil red staining, or Sudan black staining.

In addition, application is also possible, such as fluorescently labeling tissue by gene introduction, then removing and transparentizing the organ, further fluorescently labeling the transparentized tissue by immunostaining, and detecting fluorescences emitted from the 2 or more fluorescent labels in the transparentized tissue.

EXAMPLES

Example 1

Rendering Rat Spinal Cord Transparent

After perfusion fixation with 4% paraformaldehyde buffer solution, rat spinal cord was removed and further immersed in the same solution for 24 hours for fixation. The fixed spinal cord (3 mm in diameter) was immersed in the solution of thiodiethanol:glycerol:sucrose=20:40:40, the solution of 50:40:10, and the solution of 70:25:5 as pretreatment solutions each for 24 hours in that order, and then immersed in the final solution of 90:5:5 for 24 hours for transparentization.

The results are shown in B of FIG. 1. A shows the results obtained using the Scale method described in Non Patent Literature 2. The method for rendering tissue transparent according to the present invention (B) could render the spinal cord transparent with a high degree of transparency compared to the Scale method (A). Whereas the Scale method (A) had a problem that the spinal cord was swollen 2-fold, the method for rendering tissue transparent according to the present invention (B) did not cause such a problem.

Example 2

Rendering Rat Brain Transparent

Rat brain (tissue thickness: 6 mm) was fixed and rendered transparent by the procedure described in Example 1.

Figure 2:
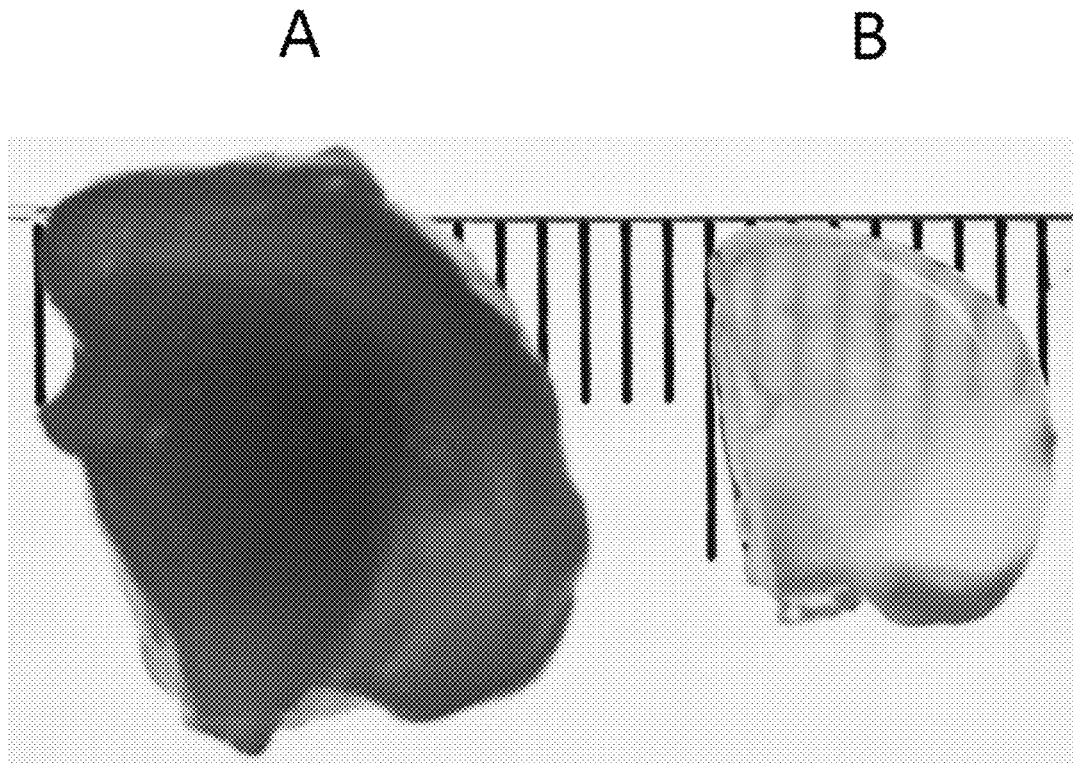
FIG. 2 is a pair of drawing substitute photographs each showing a transparentized rat brain. (A) represents the brain rendered transparent by a conventional method and (B), by the method according to the present invention.

The results are shown in B of FIG. 2. A shows the results obtained using the Scale method described in Non Patent Literature 2. The method for rendering tissue transparent according to the present invention (B) could render the brain transparent with a high degree of transparency compared to the Scale method (A). Whereas the Scale method (A) had a problem that the brain markedly expanded, and easily collapsed when pressed with a finger, the method for rendering tissue transparent according to the present invention (B) did not cause swelling or weakening.

Example 3

Fluorescent Observation of Rat Spinal Cord

A transgenic rat was prepared, in which a fluorescent protein, VENUS, is expressed in nerve axons. The transgenic rat was prepared by the method described in Non Patent Literature 3 ("Visual properties of transgenic rats harboring the channelrhodopsin-2 gene regulated by the thy-1.2 promoter." PLoS ONE, 2009, Vol. 4, No. 11, e7679). The spinal cord fixed and rendered transparent by the procedure described in Example 1 was observed using a confocal microscope (Zeiss, LSA-700).

Figure 3:
FIG. 3 is a pair of drawing substitute photographs each showing a fluorescence image obtained by rendering a rat spinal cord whose nerve axons are fluorescently labeled, transparent.
Figure 3:
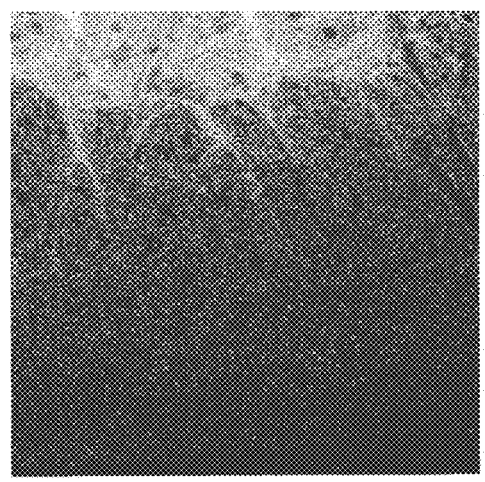

The fluorescence image obtained is shown in A of FIG. 3. B is an enlarged image of the region enclosed by a dotted line in A. The tissue observation method according to the present invention enabled the observation of nerve axons with high accuracy. The disappearance or attenuation of a fluorescence signal of the fluorescent protein could be suppressed even under conditions of a relatively high concentration (90% by volume) of thiodiethanol.

Example 4

Observation of Rat's Damaged Spinal Cord

The twelfth dorsal thoracic spinal cord of the above-described transgenic rat was cut in half with a sharp scissors to damage the spinal cord, followed by closing the wound. Four weeks later, the spinal cord was fixed and rendered transparent by the procedure described in Example 1. The transparentized spinal cord was observed under a multiphoton excitation fluorescence microscope (Nikon, A1MP).

Figure 4:
FIG. 4 is a drawing substitute photograph showing a transparentized rat's damaged spinal cord.
Figure 5:
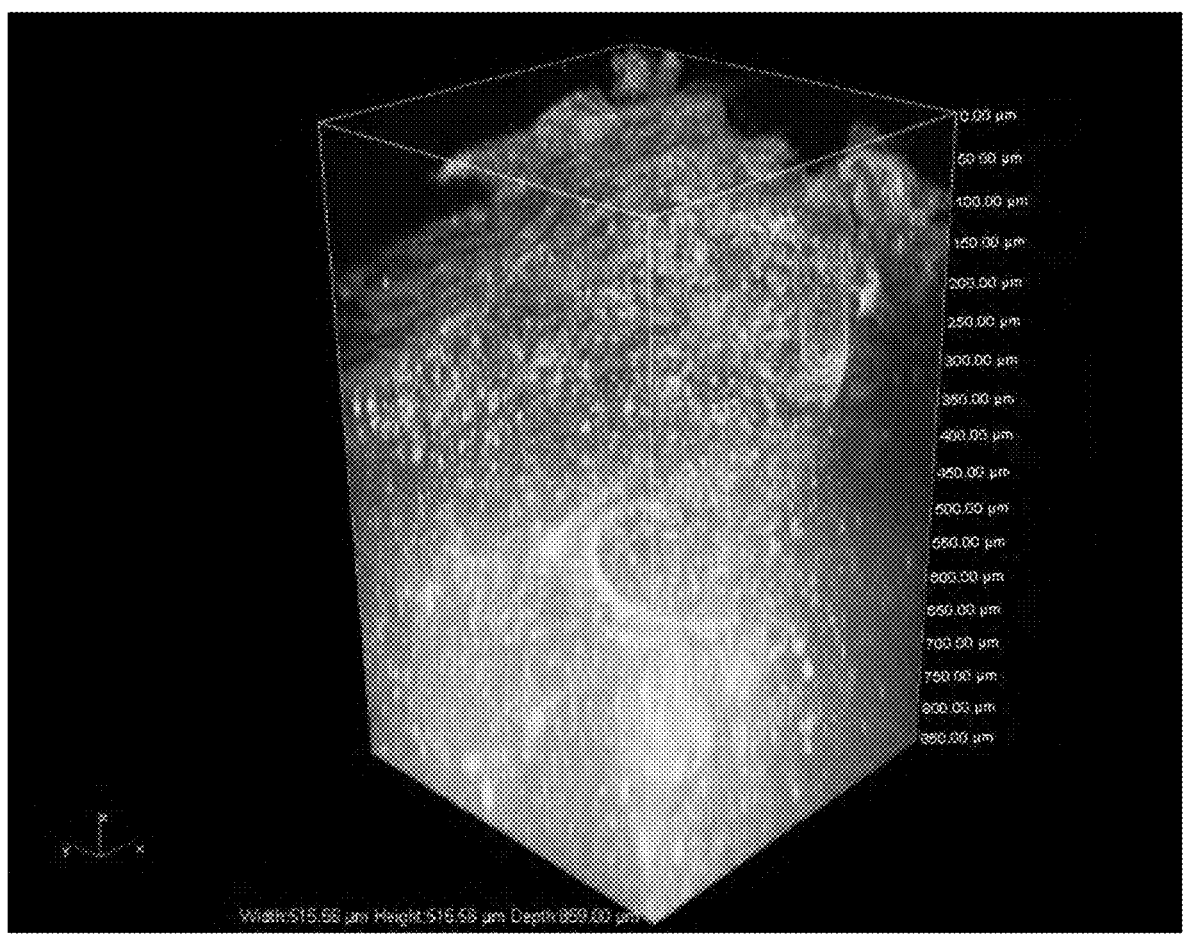
FIG. 5 is a drawing substitute photograph showing a 3-dimensional fluorescence image of a transparentized rat's damaged spinal cord.

In the transparentized spinal cord, the externally damaged site could be seen through, as shown in FIG. 4. The damaged site is visually identified in brown color under coloration with hemosiderin. The 3-dimensional fluorescence image obtained is shown in FIG. 5. In the image, the green represents a signal from a nerve axon and the blue represents the signal of second harmonic generation (SHG). Fluorescence due to SHG from collagen is observed at the damaged site, and it is identified that collagen increases with fibrosis occurring at the same site.

Example 5

Observation of Mouse Encephalomyelitis

Experimental encephalomyelitis was induced in a mouse. A proinflammatory MOG peptide emulsion was subcutaneously injected from the root of the mouse tail, and 30 days later, perfusion fixation was performed using 4% paraformaldehyde buffer solution, followed by removing the brain/spinal cord, which was then immersed in the same solution for 24 hours for fixation. The fixed brain/spinal cord was immersed in the solution of thiodiethanol:glycerol=20:80, the solution of 50:50, and the solution of 70:30 as pretreatment solutions in that order each for 24 hours and then immersed in the final solution of 90:10 for 24 hours for transparentization. The transparentized brain/spinal cord was observed under a multiphoton excitation fluorescence microscope.

Figure 6:
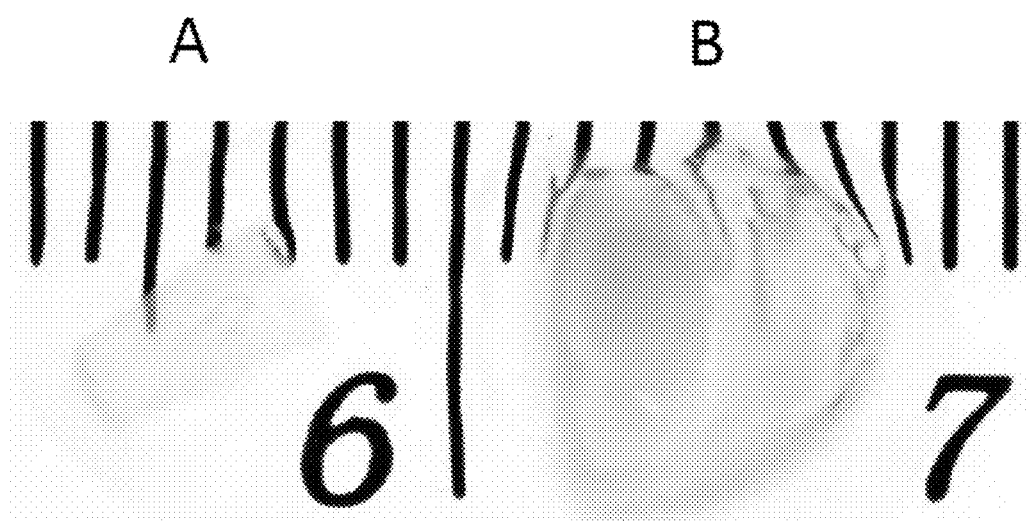
FIG. 6 is a pair of drawing substitute photographs showing an observed image of an inflamed site in transparentized mouse's spinal cord (A) and brain (B).
Figure 7:
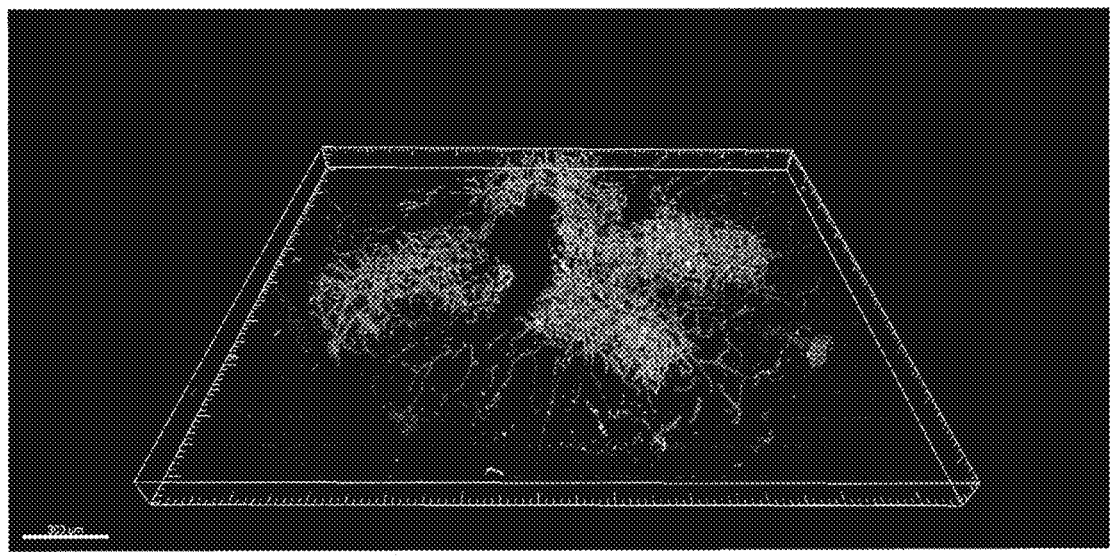
FIG. 7 is a drawing substitute photograph showing a 3-dimensional fluorescence image of a transparentized mouse's inflamed brain.

The transparentized spinal cord (A) and brain (B) are shown in FIG. 6. In this Example, the final degree of transparentization of the organ was intentionally suppressed by using a water-soluble solvent containing thiodiethanol and glycerol as reagents for rendering tissue transparent and not containing a sucrose aqueous solution. This can identify the lesion as an opacified site in the brain stem, as shown in (B) of FIG. 6. FIG. 7 shows the 3-dimensional fluorescence image obtained. In the image, the red represents blood vessels, and the green represents fluorescence images of bone marrow-derived cells. The blood vessels were fluorescently labeled by injecting a tomato lectin bound to a fluorescence reagent into the blood vessel of the animal. The bone marrow-derived cells were fluorescently labeled using a fluorescence-labeled anti-F4/80 antibody.

Example 6

Observation of Mouse Lung

Mouse lung (inferior lobe, length:height:thickness=7 mm:5 mm:5 mm) was fixed and rendered transparent by the procedure described in Example 1. The transparentized lung was observed under a multiphoton excitation fluorescence microscope for the construction of the 3-dimensional structure of alveolar blood vessels.

Figure 8:
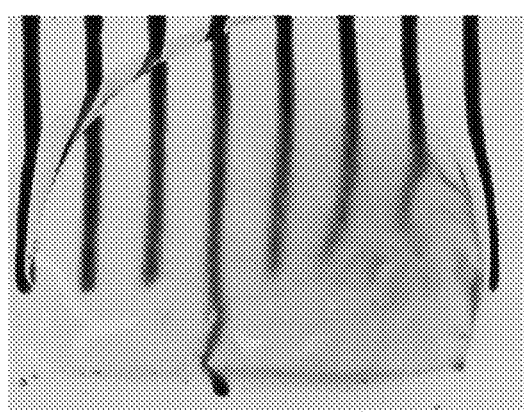
FIG. 8 is a drawing substitute photograph showing an observed image of an inflamed site in a transparentized mouse lung (A) and its gradation inverted photograph (B).
Figure 8:
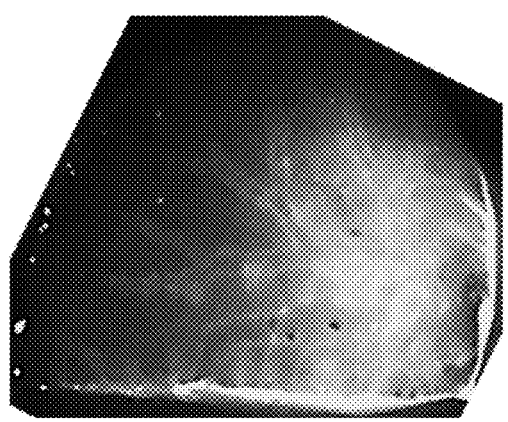
Figure 9:
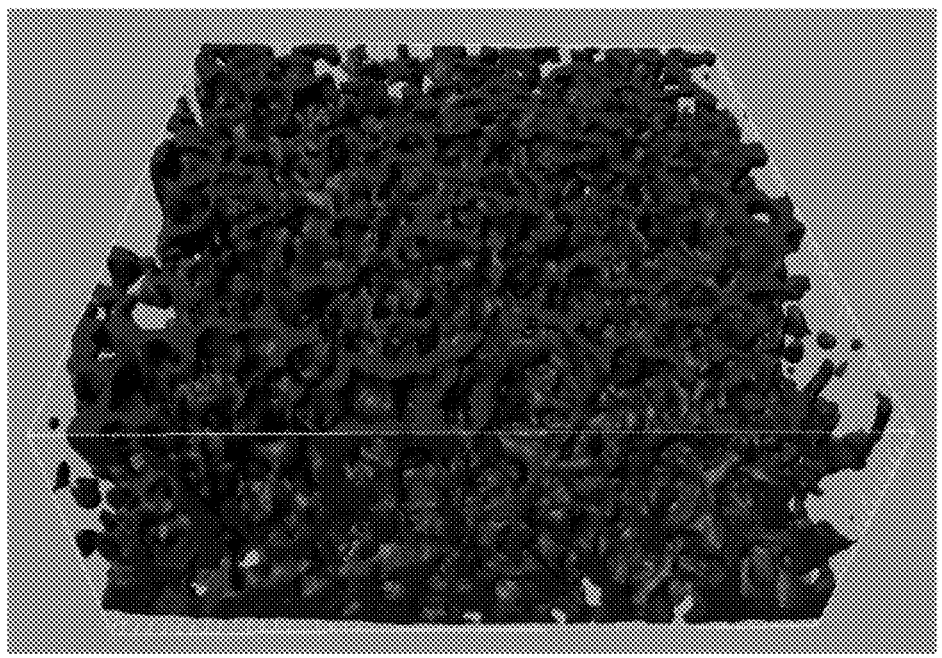
FIG. 9 is a drawing substitute photograph showing a 3-dimensional construction image of alveolar blood vessels in a transparentized mouse's inflamed lung.

The transparentized lung is shown in A of FIG. 8. B is a gradation inverted image of the image in A. In the transparentized lung, bronchi could be externally seen through, as shown in FIG. 8. FIG. 9 shows the 3-dimensional image of the alveolar blood vessels obtained.

Example 7

Observation of Cancer

Human lung cancer cells into which GFP gene is introduced were subcutaneously transplanted in nude mice, and 60 days later, cancer tissue (5 mm square) was removed and immersed in 4% paraformaldehyde buffer solution for 24 hours for fixation. The resultant was rendered transparent by the procedure described in Example 1. The transparentized cancer tissue was observed under a multiphoton excitation fluorescence microscope.

Figure 10:
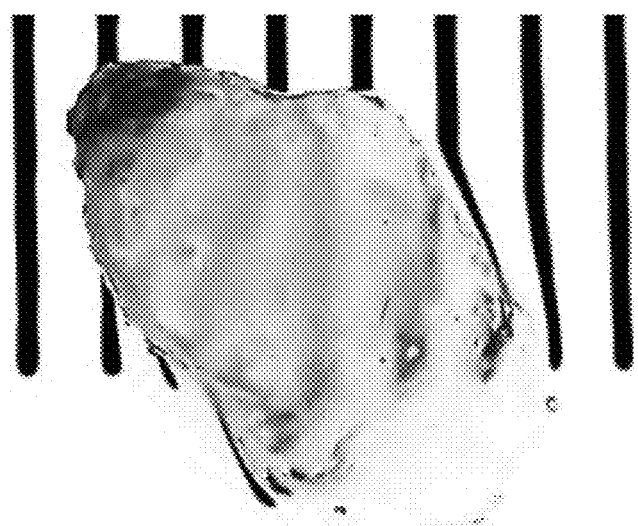
FIG. 10 is a drawing substitute photograph showing a transparentized cancer tissue.
Figure 11:
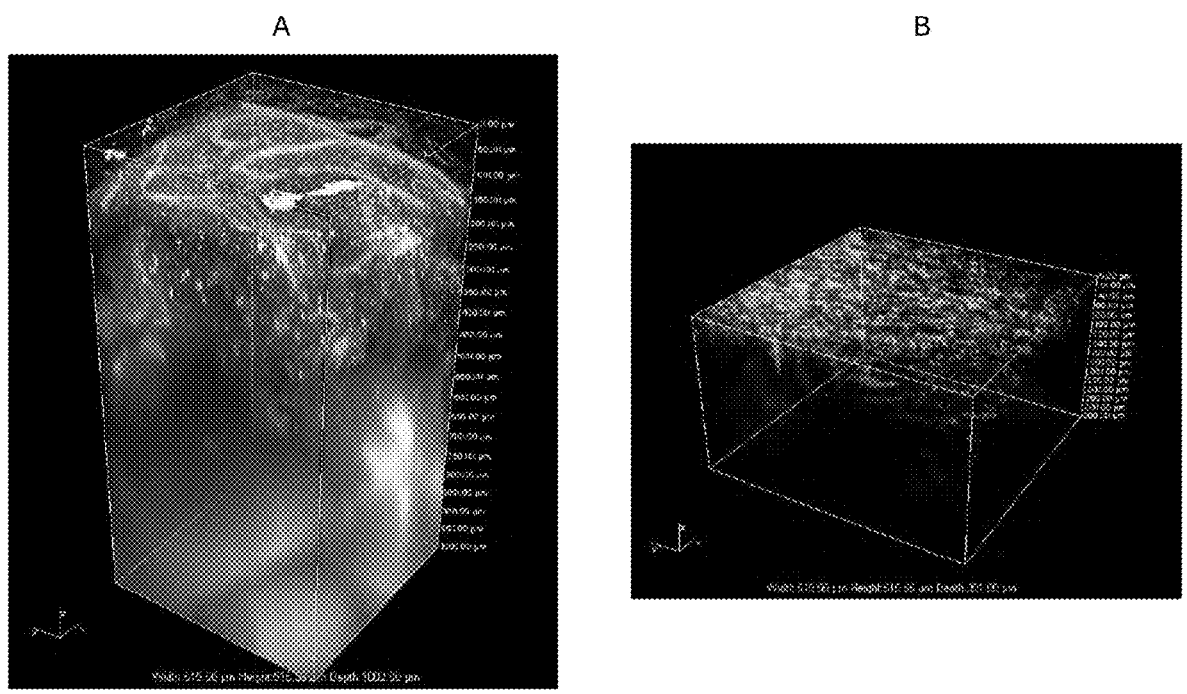
FIG. 11 is a pair of drawing substitute photographs each showing a 3-dimensional fluorescence image of a transparentized cancer tissue. (A) represents the cancer tissue rendered transparent by the method according to the present invention and (B), by a conventional method.

The transparentized cancer tissue is shown in FIG. 10. The 3-dimensional fluorescence image of the cancer tissue is shown in A of FIG. 11. B of FIG. 11 shows a fluorescent observation image of a cancer tissue rendered transparent by the Scale method. For the observation using the Scale method (B), the observation depth limit was on the order of 100 µm; tumor blood vessels could not be visualized; and the distribution of tumor cells (green in the image) was not clear. In contrast, for observation using the method for rendering tissue transparent according to the present invention (A), the observation depth limit was 1,000 µm or more; tumor blood vessels (red in the image) could be visualized; and the distribution of tumor cells was identified. The fluorescence signal of GFP was shown to be well retained.

Example 8

Rendering Rat Heart/Mouse Liver Transparent

Figure 12:
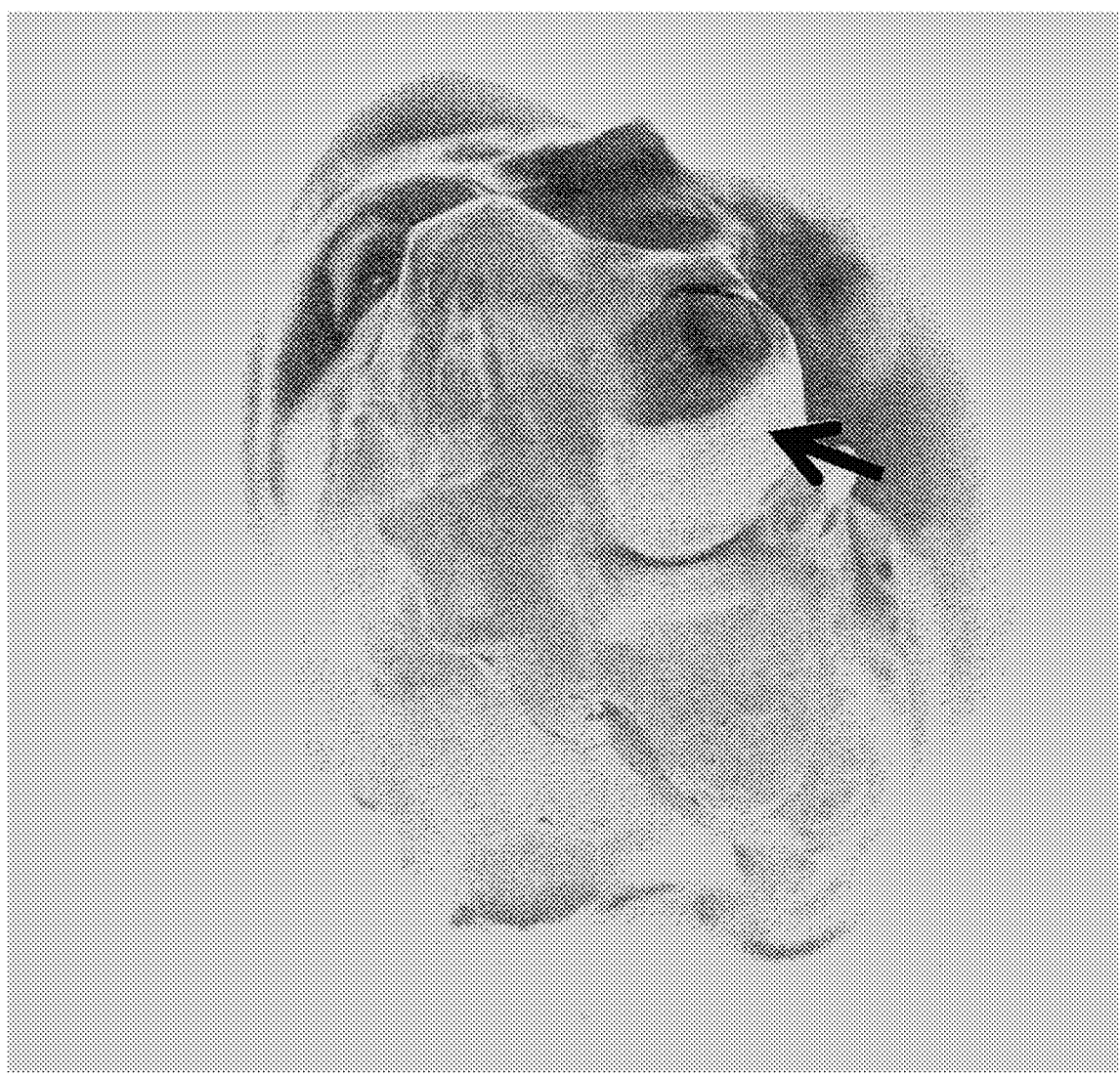
FIG. 12 is a drawing substitute photograph showing a transparentized rat heart.
Figure 13:
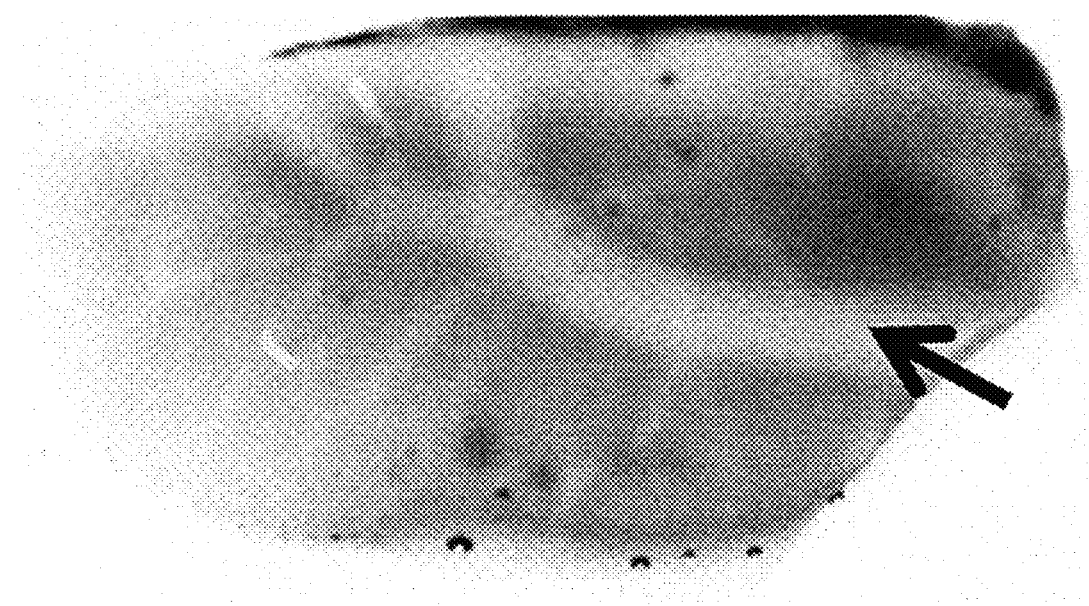
FIG. 13 is a drawing substitute photograph showing a transparentized mouse liver.

Rat heart (1.2 cm square) and Mouse liver (length:height:thickness=1 cm:1 cm:6 mm) were fixed and rendered transparent by the procedure described in Example 1. The results are shown in FIGS. 12 and 13. The arrow in FIG. 12 represents an aorta. The arrow in FIG. 13 represents a portal vein.

Example 9

Staining after Transparentization

The rat brain rendered transparent in Example 2 was sliced and subjected to immunostaining, fat staining, nuclear staining, and Nissl's staining of glial fibrillary acidic protein (GFAP).

The immunostaining was carried out employing a commercial detection kit using an anti-GFAP antibody, an enzyme (peroxidase), and a dye (diaminobenzidine tetrahydrochloride). Sudan III was used for the fat staining. DAPI was used for the nuclear staining. Toluidine blue was used for the Nissl's staining.

Figure 14:
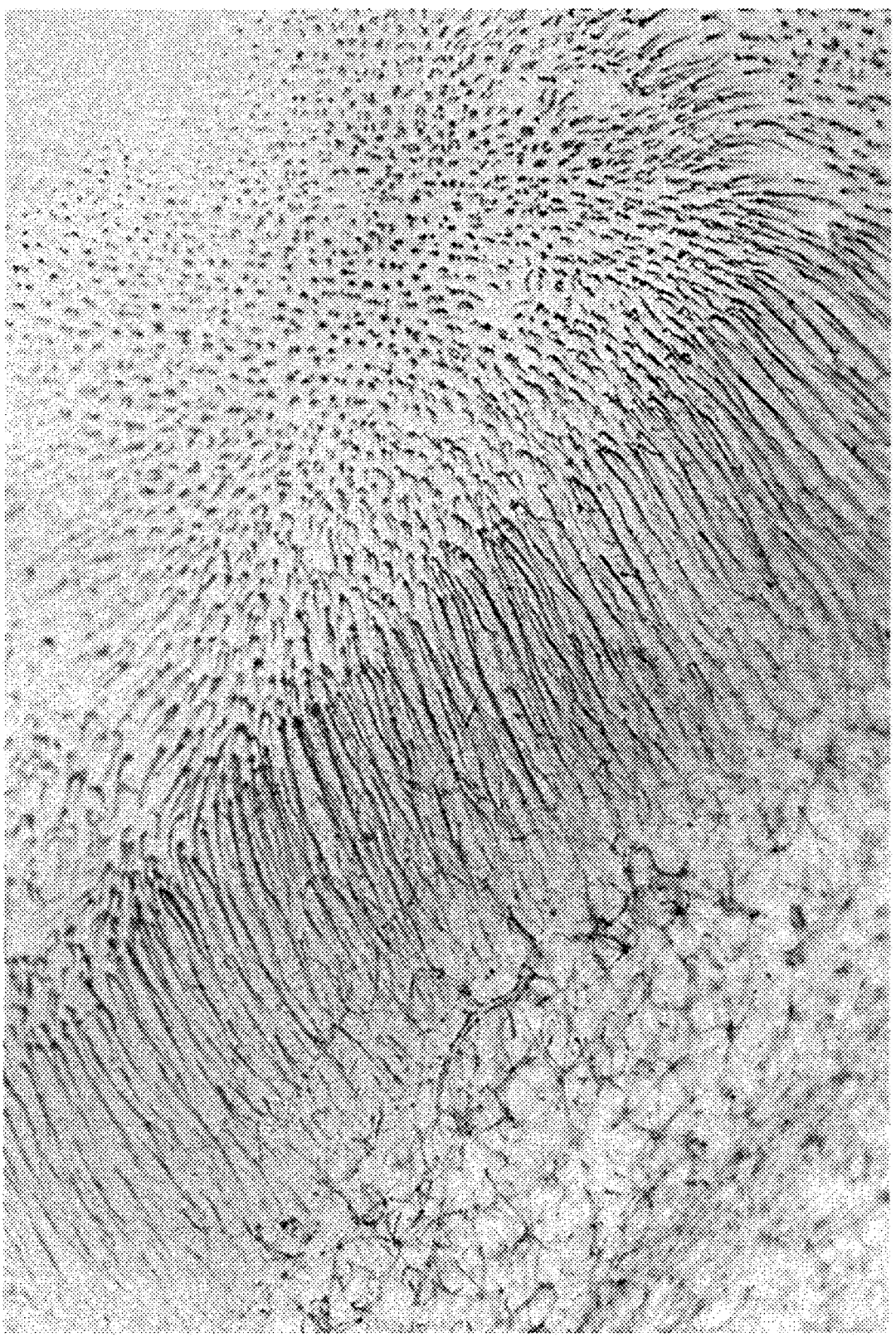
FIG. 14 is a drawing substitute photograph showing an immunostaining image of a transparentized rat brain.
Figure 15:
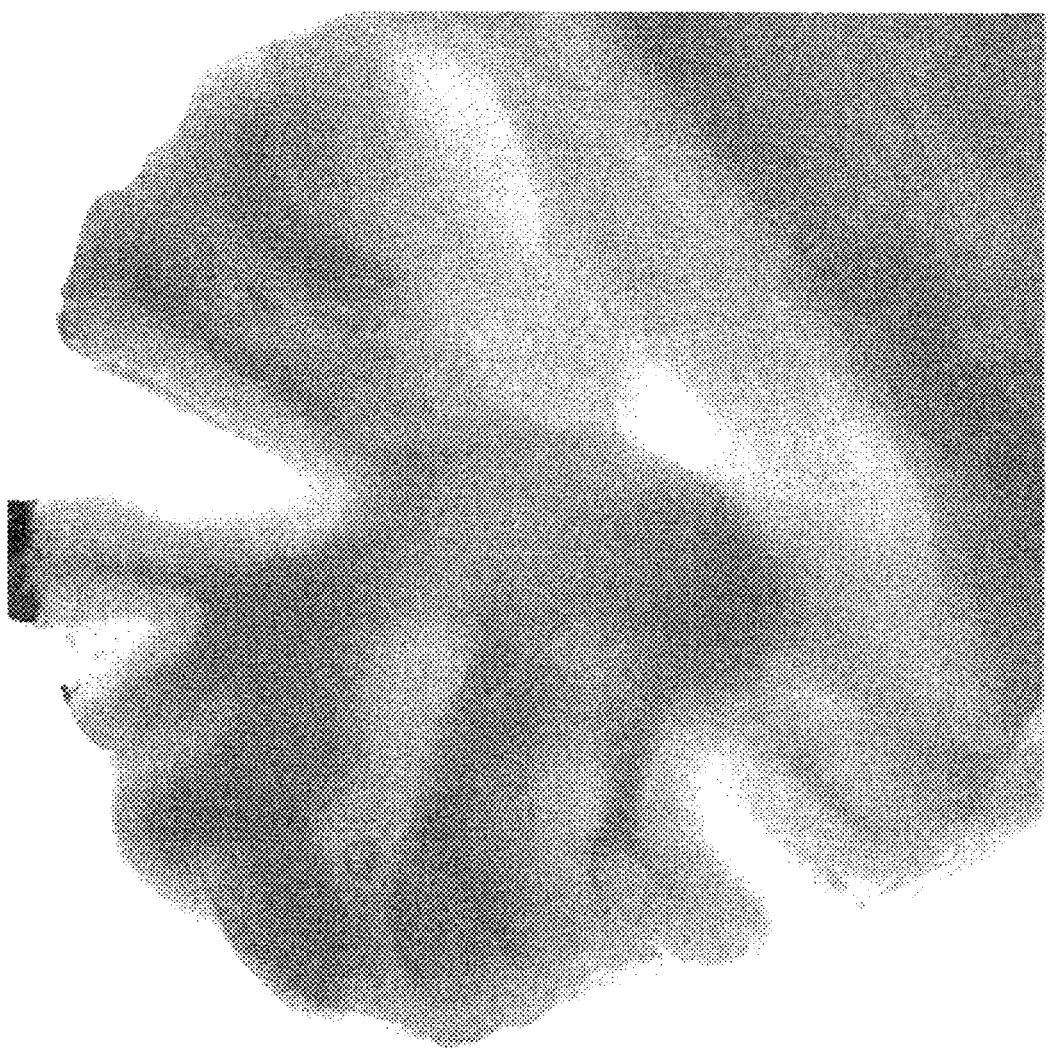
FIG. 15 is a drawing substitute photograph showing a fat staining image of a transparentized rat brain.
Figure 16:
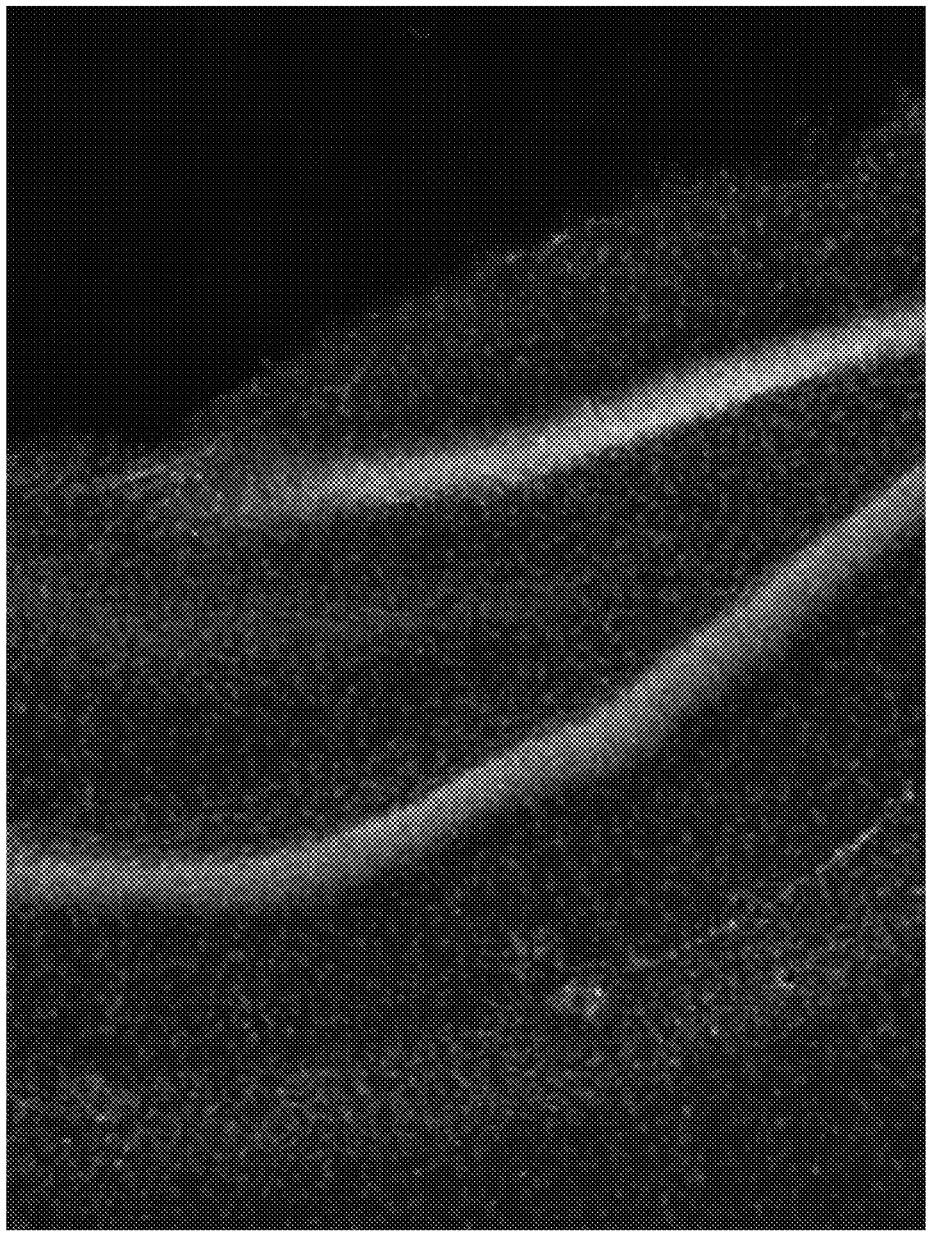
FIG. 16 is a drawing substitute photograph showing a nuclear staining image of a transparentized rat brain.
Figure 17:
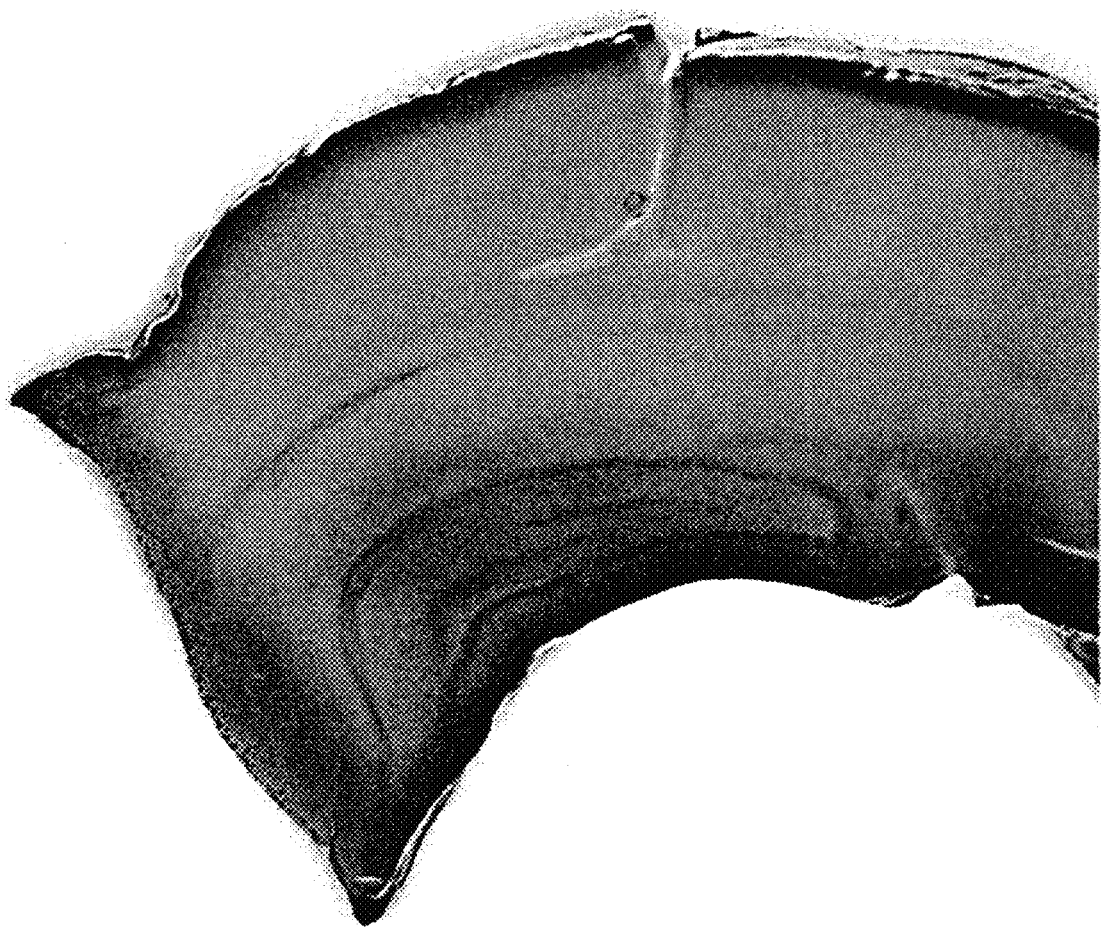
FIG. 17 is a drawing substitute photograph showing a Nissl's staining image of a transparentized rat brain.

The results are shown in FIGS. 14 to 17. FIG. 14 shows immunostaining images of GFAP-positive cerebellar Bergmann glial cells. FIG. 15 shows the results of fat staining; FIG. 16, nuclear staining; and FIG. 17, Nissl's staining. In FIG. 14, the transparentization achieves excellent depth visualization. The desired staining of cerebellar white matter, cell nuclei, and nerve cells can also be identified for fat staining, nuclear staining, and Nissl's staining, respectively.

Example 10

Rendering Rat Individual Transparent

Figure 18:
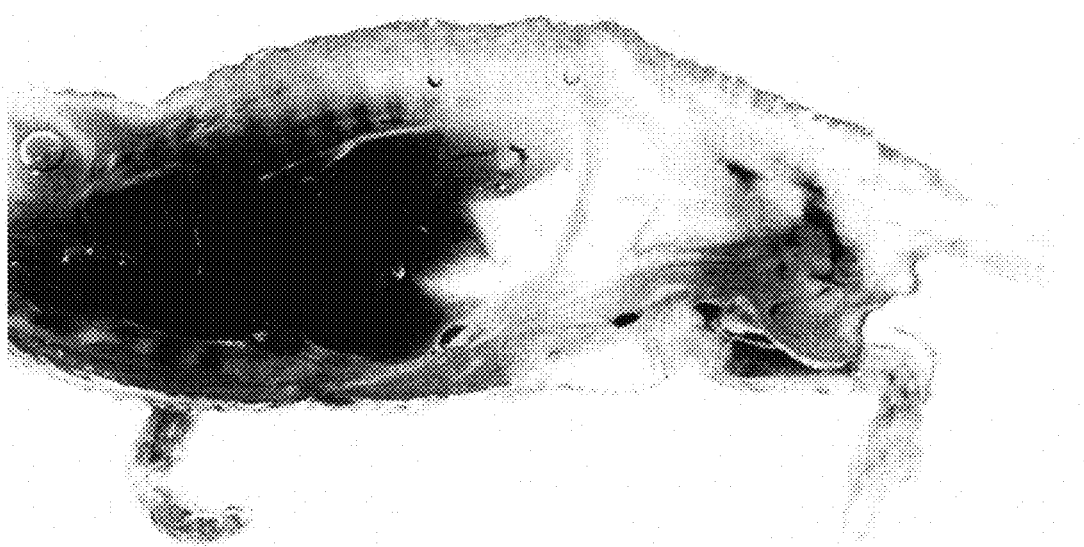
FIG. 18 is a drawing substitute photograph showing a transparentized rat individual.

A 4-day old rat individual was immersed in a pretreatment solution (thiodiethanol:30% sucrose=20:80) at 4° C. for 24 hours and in a final solution (thiodiethanol:glycerol:30% sucrose=90:5:5) at 4° C. for 48 hours for transparentization. The results are shown in FIG. 18. The rat individual is identified to have been wholly rendered transparent.

Example 11

Study of Organoiodine Compound

Human lung cancer cells into which GFP gene is introduced were subcutaneously transplanted in nude mice and grown for 4 weeks. A tomato lectin bound to a fluorescence reagent was injected into the blood vessel of the animal, followed by perfusion fixation with 4% paraformaldehyde buffer solution. The cancer tissue was removed and immersed in 4% paraformaldehyde buffer solution for 24 hours for fixation.

Figure 19:
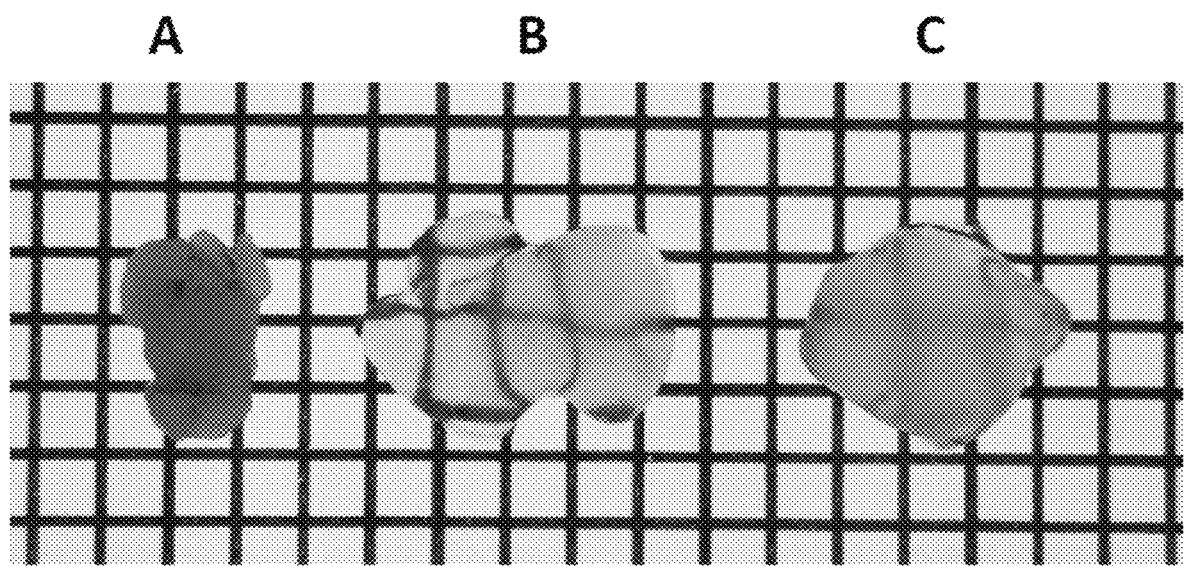
FIG. 19 is a series of drawing substitute photographs each showing a cancer tissue transparentized using a reagent for rendering tissue transparent comprising a nonionic organoiodine compound.

The fixed cancer tissue was immersed in a pretreatment solution (thiodiethanol:30% sucrose=20:80) at 4° C. for 24 hours and in a final solution (thiodiethanol:glycerol:iomeprol=50:5:45) at 4° C. for 24 hours for transparentization. The results are shown in B of FIG. 19. Iomeron®, Eisai Co., Ltd. was used as iomeprol. Iomeron® 400 has an iodine content of 40% and a refractive index of 1.51.

A represents the cancer tissue fixed with 4% paraformaldehyde buffer solution. C represents a cancer tissue rendered transparent by immersion in the pretreatment solution (thiodiethanol:30% sucrose=20:80) at 4° C. for 24 hours and in a final solution (thiodiethanol:glycerol=90:10) at 4° C. for 24 hours. In B where the organoiodine compound was used, the highest degree of transparency was obtained.

Blood vessels fluorescently labeled with the tomato lectin in the transparentized cancer tissue were observed under a multiphoton excitation fluorescence microscope. For the fixed cancer tissue shown in A, its interior portion could not be observed at all due to the connective tissue coat on the cancer tissue surface. For the transparentized cancer tissue shown in C, the observation depth limit was about 800 µm. For the transparentized cancer tissue shown in B, tumor blood vessels could be visualized above a detection limit with a microscope of about 1,800 µm and moreover, no attenuated fluorescence signal from GFP in cancer cells was observed. These results showed that the use of the final solution containing the nonionic organoiodine compound aqueous solution provided a high degree of transparentization and demonstrated that its use could well retain the fluorescence signal of GFP under the reduced amount of thiodiethanol to be used.

Example 12

Rendering Mouse Brain Transparent 2

Figure 20:
FIG. 20 is a pair of drawing substitute photographs each showing a transparentized mouse brain.
Figure 20:

After perfusion fixation with 4% paraformaldehyde buffer solution, mouse brain was removed and further immersed in the same solution for 24 hours for fixation. The fixed brain (tissue thickness: 6 mm) was immersed in the solution of thiodiethanol:iomeprol=50:50 at 25° C. for 48 hours. The results are shown in A of FIG. 20.

The fixed brain was also immersed in the solution of thiodiethanol:iomeprol:glycerol=50:44.5:5.5 at 20° C. for 48 hours. The results are shown in B of FIG. 20.

As shown in the figure, the use of iomeprol could render the brain transparent while reducing the proportion by volume of thiodiethanol to 50%. When glycerol was added (B), the degree of transparentization was markedly enhanced compared to that when no glycerol was added (A). Stomach, kidney, and uterus could be rendered transparent by the same procedure (the diagrammatic representation is abbreviated).

Example 13

Fluorescent Observation of Mouse Brain Blood Vessel

EGFP was expressed in the blood brain vessels of a mouse by using a retroviral vector for expressing EGFP. The brain fixed and rendered transparent by the same procedure as in Example 12 was observed under a confocal microscope (Zeiss, LSA-700).

Figure 21:
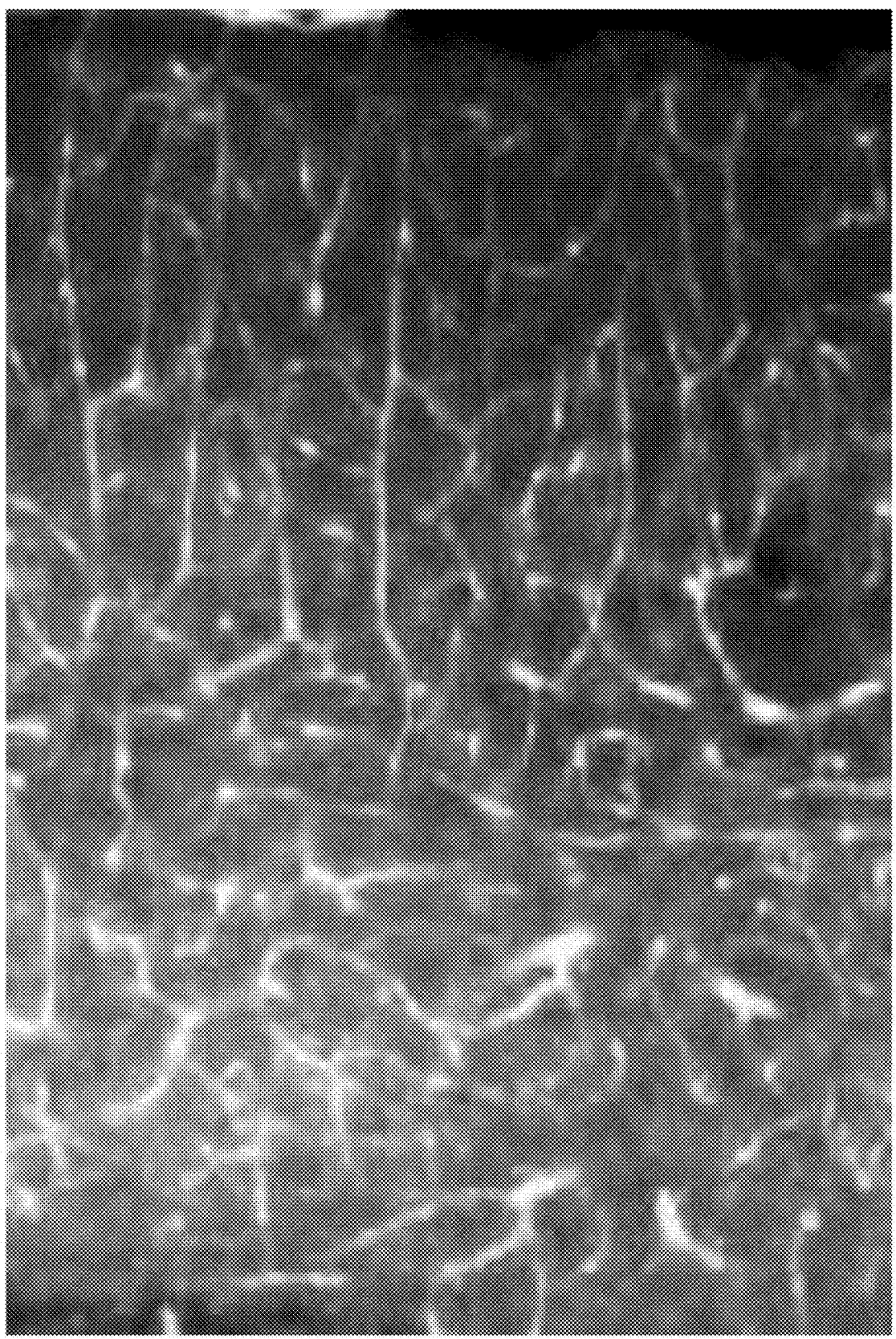
FIG. 21 is a drawing substitute photograph showing a fluorescence image obtained by rendering a mouse brain whose cerebral blood vessels are fluorescently labeled transparent.

The fluorescence image obtained is shown in FIG. 21. The use of iomeprol enabled the observation of the brain blood vessels fluorescently labeled with EGFP with high accuracy.

Comparative Example

Study of Solution of Thiodiethanol Alone

After perfusion fixation with 4% paraformaldehyde buffer solution, rat brain was removed and further immersed in the same solution for 24 hours for fixation. The fixed brain (tissue thickness: 4 mm) was immersed in thiodiethanol for 3 days.

Figure 22:
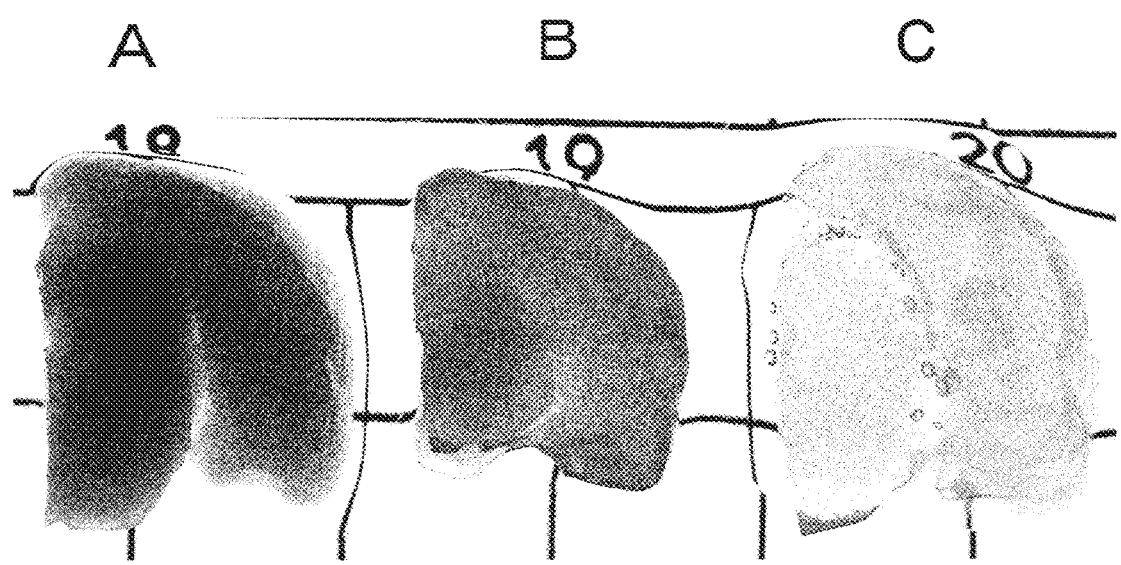
FIG. 22 is a series of drawing substitute photographs, one of which shows the results of immersing a rat brain in a solution of thiodiethanol alone for comparison.

The results are shown in FIG. 22. A represents the brain fixed with 4% paraformaldehyde buffer solution. B represents the brain immersed in the solution of thiodiethanol alone. C represents the brain immersed in a pretreatment solution (thiodiethanol:30% sucrose=20:80) at 4° C. for 24 hours and in a final solution (thiodiethanol:glycerol=90:10) at 4° C. for 48 hours for transparentization. For immersion in the solution of thiodiethanol alone, the thick brain tissue could not be rendered transparent.

INDUSTRIAL APPLICABILITY

The method for rendering tissue transparent according to the present invention can sufficiently render various organs transparent without causing their changes by a simple operation without using any poisonous or dangerous organic solvent. Thus, the method for rendering tissue transparent according to the present invention can be used for observing the internal tissue of an organ without performing the burdensome preparation of tissue sections in various fields, such as disease state analysis, pharmacokinetics, and cancer metastasis screening.

The invention claimed is:

1. A method for rendering tissue transparent, comprising:
a step of fixing a tissue;
a step of immersing the fixed tissue in a water-soluble solvent comprising 2,2'-thiodiethanol, a nonionic organoiodine compound, and optionally glycerol; and
a step of observing the fixed tissue using a fluorescence microscope, a fluorescence stereomicroscope, a confocal microscope, or a multiphoton microscope,
wherein:
the tissue comprises a tissue surface and a tissue site, the tissue site being located at a depth of 1 mm or more below the tissue surface; and
the step of observing comprises detecting fluorescence emitted from the tissue site by the use of the fluorescence microscope, the fluorescence stereomicroscope, the confocal microscope, or the multiphoton microscope.

2. The method for rendering tissue transparent according to claim 1, wherein the solvent is a mixed solution of 2,2'-thiodiethanol, glycerol, and a nonionic organoiodine compound aqueous solution wherein proportions by volume of 2,2'-thiodiethanol, glycerol, and a nonionic organoiodine compound aqueous solution having an iodine content of 40% are 10 to 50%, 1 to 20%, and 10 to 70%, respectively.

3. The method for rendering tissue transparent according to claim 1, wherein the solvent is a mixed solution of 2,2'-thiodiethanol and a nonionic organoiodine compound aqueous solution wherein proportions by volume of 2,2'-thiodiethanol and a nonionic organoiodine compound aqueous solution having an iodine content of 40% are 20 to 80% and 80 to 20%, respectively.

4. The method for rendering tissue transparent according to claim 1, wherein the solvent further comprises a sucrose aqueous solution.

5. The method for rendering tissue transparent according to claim 1, wherein the solvent has a refractive index of 1.4 to 1.7.

6. The method for rendering tissue transparent according to claim 1, wherein the tissue is one or more selected from the group consisting of the brain, spinal cord, liver, lung, heart, blood vessel, and cancer tissue.

7. The method for rendering tissue transparent according to claim 1, wherein the nonionic organoiodine compound comprises one or more of ioxilan, iotrolan, iopamidol, iopromide, iohexol, or iomeprol.

8. The method for rendering tissue transparent according to claim 1, wherein the nonionic organoiodine compound comprises iomeprol.

9. The method for rendering tissue transparent according to claim 1, wherein the step of fixing the sample of the tissue includes immersing the tissue in a formalin solution.

10. The method for rendering tissue transparent according to claim 1, wherein the step of observing the fixed tissue comprises using the multiphoton microscope.

11. The method for rendering tissue transparent according to claim 1, further comprising, between the step of fixing and the step of immersing, a step of fluorescently labeling the fixed tissue.

12. The method for rendering tissue transparent according to claim 11, wherein the step of observing the fixed tissue comprises using the multiphoton microscope.

13. The method for rendering tissue transparent according to claim 1, further comprising, between the step of immersing and the step of observing, a step of fluorescently labeling the fixed tissue.

14. The method for rendering tissue transparent according to claim 13, wherein the step of observing the fixed tissue comprises using the multiphoton microscope.

* * * * *